J. M. Horton,
Auger Handle,
No. 2,229, Reissued Apr. 17, 1866.
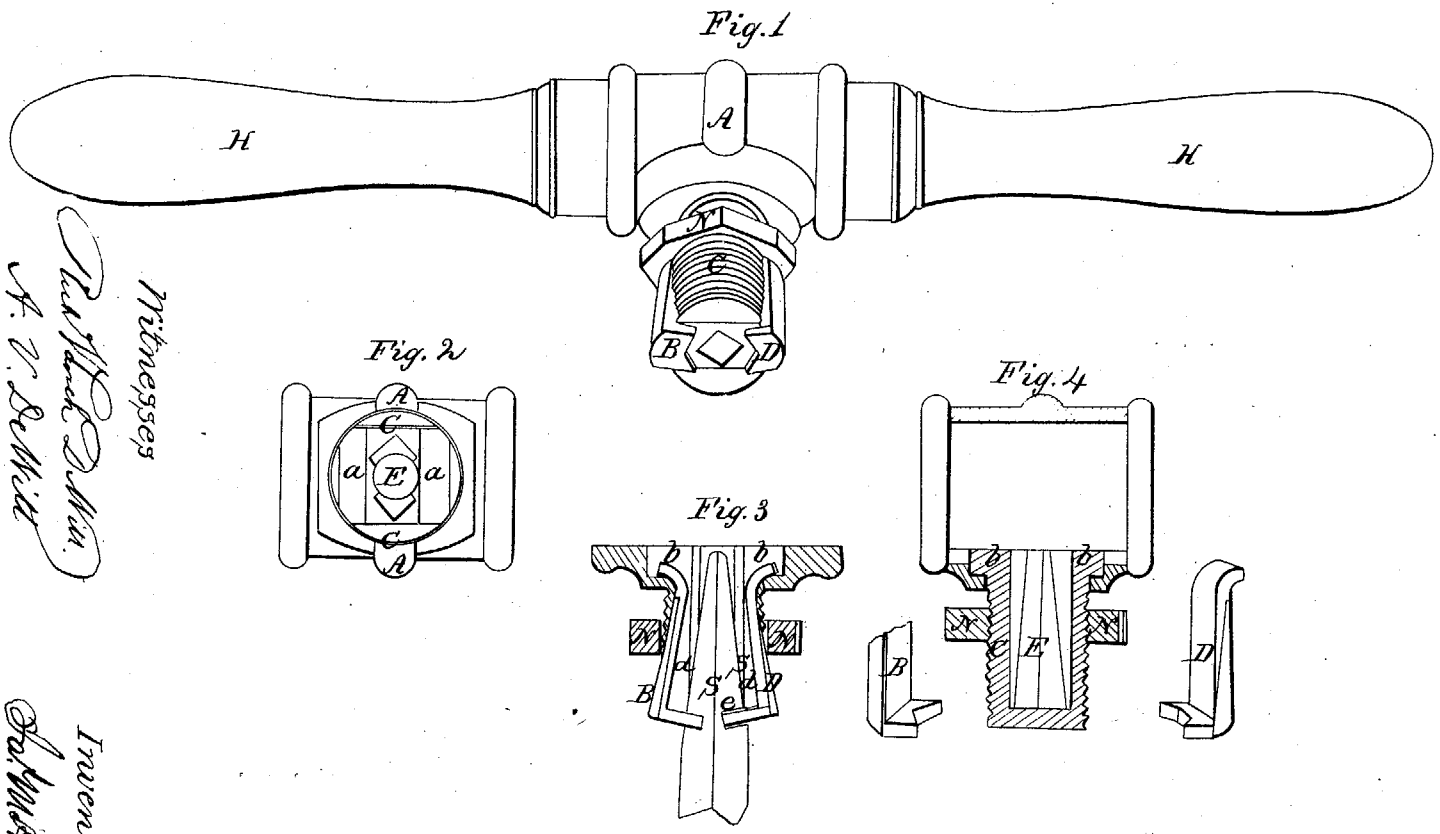
Witnesses
Rich Varick DeWitt
A. V. DeWitt
Inventor
Jas. M. Horton
N. PETERS, PHOTO-LITHOGRAPHER, WASHINGTON, D. C.

UNITED STATES PATENT OFFICE.

JAMES M. HORTON, OF ALBANY, NEW YORK, ASSIGNOR, BY MESNE ASSIGNMENTS, TO HIMSELF.

IMPROVEMENT IN ATTACHING AUGERS TO THEIR HANDLES.

Specification forming part of Letters Patent No. 35,856, dated July 8, 1862; Reissue No. 2,229, dated April 17, 1866.

*To all whom it may concern:*

Be it known that I, JAMES M. HORTON, of the city of Albany, State of New York, have invented a shank-socket for use with auger-handles, adapted to the service of augers of various sizes whose shanks are necessarily of different sizes, so that the handle may suffice for the service of any number of augers; and I declare the following specification, with the drawings hereto attached as a part of the same, to be a full and complete description of my invention.

Figure 1 represents in perspective the socket as attached to an auger-handle. Fig. 2 is a view of the socket in plan, as seen from below, with the shank's grips removed. Fig. 3 is a vertical sectional view through the center of the socket, showing the shank of an auger fastened within the grips. Fig. 4 is a similar section of the socket, showing the grips detached and exhibited separately.

Similar letters denote the same parts of the apparatus.

H H, Fig. 1, is an auger-handle. (Shown in outline.) A is a metal band surrounding its center, and whose lower part is formed into a projecting-cylinder, C, about one and a quarter inch in diameter and length. On opposite sides of it a recess, *a a*, about three-quarters of an inch wide and three-sixteenths of an inch deep, is sunk, and continued under and across the bottom. The upper end of this recess terminates in a deeper recess, *b b*, within the lower portion of the band A. This recess is intended to receive the jaws or grips B and D, the forms of which are shown in the perspective in Fig. 4. The upper ends of them are curved to lie within the recesses *b b*, and act as hinges on which they can swing to and from the center of the socket. Their lower ends project from them so as to underlie the cylinder C, their edges, which face each other, being cut into angular jaws, as shown. Along the center axis of the cylinder there is made rectangular tapering bore, E, sufficient to receive the largest sized auger-shank to be used with the handle.

The cylindrical portions of the socket C have a screw-thread cut upon their periphery and fitted thereto a screw ring-nut, N, to hold the grips B and D firm when in place. The upper end or hinge part of the grips are so fitted within their recesses that their upper surfaces are below the outside range of the cylinder C, in consequence of which, when the nut is up near the handle, the lower part of B and D can swing out, as shown in Figs. 1 and 3, and receive between them and hold a large shank, S, or, when screwed down, can hold a small shank, thus adapting itself to augers of various sizes.

In order to hold the shank from quitting the socket when the auger is drawn upward, a notch is made in one of the angular edges of the shank, as shown at Fig. 3, and the jaw D, Fig. 4, is not cut down to the depth of its angle, but a portion of the metal is left to lie within the notch *e*.

This apparatus is especially intended for use with augers; but I intend its application as well to center bits or any other analogous boring-machinery.

What I claim as my invention, and desire to secure by Letters Patent, is—

Attaching augers to their handles by means of barrel A, cylinder C, having a central rectangular tapering bore, and provided with grips B and D, that are operated upon by nut N, working on a screw-thread upon the cylinder, all arranged to operate substantially as described.

JAS. M. HORTON.

Witnesses:

RICHD. VARICK DE WITT,

A. V. DE WITT.